United States Patent
Drozdovskyy et al.

(10) Patent No.: US 10,419,900 B2
(45) Date of Patent: Sep. 17, 2019

(54) METHOD AND APPARATUS FOR MANAGING APPLICATION TERMINAL REMOTELY IN WIRELESS COMMUNICATION SYSTEM

(71) Applicant: Samsung Electronics Co., Ltd., Gyeonggi-do (KR)

(72) Inventors: Taras Drozdovskyy, Kyiv (UA); Artem Andrieiev, Poltava region (UA); Dmytro Prokopchuk, Kharkiv region (UA); Igor Kharlan, Kyiv (UA); Kseniia Shaposhnikova, Kyiv (UA); Nazar Holfamid, Kyiv region (UA)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/942,486

(22) Filed: Nov. 16, 2015

(65) Prior Publication Data
US 2016/0142890 A1 May 19, 2016

(30) Foreign Application Priority Data
Nov. 14, 2014 (KR) .................. 10-2014-0158934

(51) Int. Cl.
| | |
|---|---|
| *H04W 4/20* | (2018.01) |
| *H04W 8/18* | (2009.01) |
| *H04L 12/24* | (2006.01) |
| *H04W 12/08* | (2009.01) |
| *H04W 4/50* | (2018.01) |
| *H04W 12/06* | (2009.01) |

(52) U.S. Cl.
CPC ............. *H04W 4/20* (2013.01); *H04L 41/046* (2013.01); *H04L 41/0803* (2013.01); *H04W 4/50* (2018.02); *H04W 8/18* (2013.01); *H04W 12/08* (2013.01); *H04W 12/06* (2013.01)

(58) Field of Classification Search
CPC .......... H04W 4/02; H04W 4/001; G06F 21/53
See application file for complete search history.

(56) References Cited

U.S. PATENT DOCUMENTS

| | | | | |
|---|---|---|---|---|
| 2014/0198702 | A1* | 7/2014 | Lin ........................ | H04W 4/06 370/312 |
| 2015/0127938 | A1* | 5/2015 | Chastain ................ | H04L 63/08 713/168 |
| 2015/0127945 | A1* | 5/2015 | Chastain ............... | H04W 12/06 713/170 |

(Continued)

*Primary Examiner* — Ernest G Tacsik
(74) *Attorney, Agent, or Firm* — The Farrell Law Firm, P.C.

(57) ABSTRACT

The present disclosure relates to a method and an apparatus for remotely managing an application in a wireless communication system. A method for supporting a remote management of an application by a terminal according to an embodiment of the present disclosure comprises: receiving a management instruction for a remote management of the application transmitted from a management server through a mobile communication network according to a request of a service server of a service provider providing the application; processing the management instruction received through a baseband, based on a trusted execution environment (TEE) which is a secured environment; and transmitting an execution result of the management instruction to the management server.

12 Claims, 5 Drawing Sheets

(56) References Cited

U.S. PATENT DOCUMENTS

| | | | |
|---|---|---|---|
| 2015/0271160 A1* | 9/2015 | Ponsini | H04L 63/0464 713/171 |
| 2015/0331698 A1* | 11/2015 | Dietze | G06F 8/65 713/2 |
| 2016/0070932 A1* | 3/2016 | Zimmer | G06F 21/72 713/192 |
| 2016/0134660 A1* | 5/2016 | Ponsini | H04L 63/20 726/1 |

* cited by examiner

METHOD AND APPARATUS FOR MANAGING APPLICATION TERMINAL REMOTELY IN WIRELESS COMMUNICATION SYSTEM

PRIORITY

This application claims the priority under 35 U.S.C. § 119(a) to Korean Application Serial No. 10-2014-0158934, which was filed in the Korean Intellectual Property Office on Nov. 14, 2014, the entire content of which is hereby incorporated by reference.

BACKGROUND

1. Field of the Disclosure

The present disclosure relates to a remote managing method and apparatus in a wireless communication system, and more particularly to a method and an apparatus for remotely managing an application installed in a terminal.

2. Description of the Related Art

A wireless communication system involves a step that is capable of providing a high speed data communication service as well as voice communication due to the development of technology. In addition, recently, the propagation of various wireless devices (hereinafter, a terminal), such as a smart phone and a tablet PC, is rapidly increasing. Further, a wireless environment that is capable of providing various services, such as security, finance, information service, and the like, as well as a multimedia service for a user by installing applications that are provided by various service providers in the terminal, have been generalized.

However, various applications provided from the service provider in the wireless environment have weak security, and thus may be easily exposed to an external attack. Thus, the application(s) operated in a terminal is required to be executed in an environment in which the security and the like are reliable.

SUMMARY

The present disclosure provides an effective method and an apparatus for remotely managing an application of a terminal in a wireless communication system.

In addition, the present disclosure provides a method and an apparatus for remotely managing an application of a terminal through a Mobile Network Operator (MNO) in a wireless communication system.

In addition, the present disclosure provides a method and an apparatus for processing a management instruction for remotely managing an application of a terminal in a wireless communication system.

According to an aspect of the present disclosure, a method for supporting a remote management of an application by a terminal in a wireless communication system comprises: receiving a management instruction for a remote management of the application from a management server according to a request of a service server providing the application; processing the management instruction, based on a trusted execution environment (TEE), which is a secured environment; and transmitting an execution result of the management instruction to the management server.

In addition, according to an aspect of the present disclosure, a terminal for supporting a remote management of an application in a wireless communication system comprises: a communication interface for wireless communication; and a controller configured to control to receive a management instruction for the remote management of the application from a management server through a mobile communication network according to a request of a service server providing the application, processes the management instruction based on a trusted execution environment (TEE), which is a secured environment, and to transmit an execution result of the management instruction to the management server.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

In the following description of embodiments of the present disclosure, a detailed description of known functions or configurations incorporated herein will be omitted when it is determined that the detailed description thereof may unnecessarily obscure the subject matter of the present disclosure.

Figure 1:
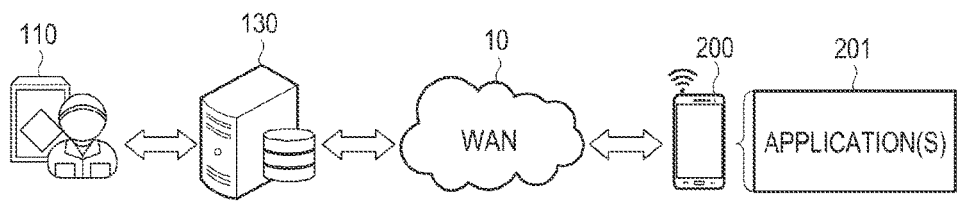
FIG. 1 is a block diagram illustrating an example of a wireless communication system for remotely managing an application of a terminal according to an embodiment of the present disclosure.

FIG. 1 is a block diagram illustrating an example of a wireless communication system for remotely managing an application of a terminal according to an embodiment of the present disclosure.

The wireless communication system of FIG. 1 includes a service server 110 of a Service Provider (SP), a management server 130 transmitting a management instruction for a remote management of the application(s) 201 to a terminal 200 according to a request of the service server 110, and the terminal 200 executing the management instruction for the application(s) 201. In FIG. 1, the service server 110 provides the application(s) 201 executed in the terminal 200. The management server 130 transmits the management instruction for at least one remote management related to an installation, an updating, a removing, an auditing, a locking, an unlocking, and a data migration (which includes a data migration to another terminal or an external server, and the like), and the like of the application(s) 201 to the terminal 200 through a communication network 10 according to the request of the service server 110. In addition, the terminal 200 executes the management instruction in a Trusted Execution Environment (TEE) which is a security platform for a secure remote management of the application(s) 210, and transmits an execution result of the management instruction to the management server 130.

Further, the TEE is a security platform providing a trusted execution environment which is separated from various mobile operating systems (e.g., Android OS and the like) and the application(s). Therefore, when the management instruction for the application(s) 210 is executed in the TEE, an external indiscriminate access to the application(s) 201 may be blocked. The operator server 110 may remotely manage the application(s) 201 by transmitting the management instruction to the terminal 200 through the management server 130. The management server 130 may provide an authorization between the operator server 110 and the terminal 200, and may configure a communication connection with the terminal 200 through a communication network 10 such as an Internet Protocol (IP) based Wide Area Network (WAN).

Figure 2:
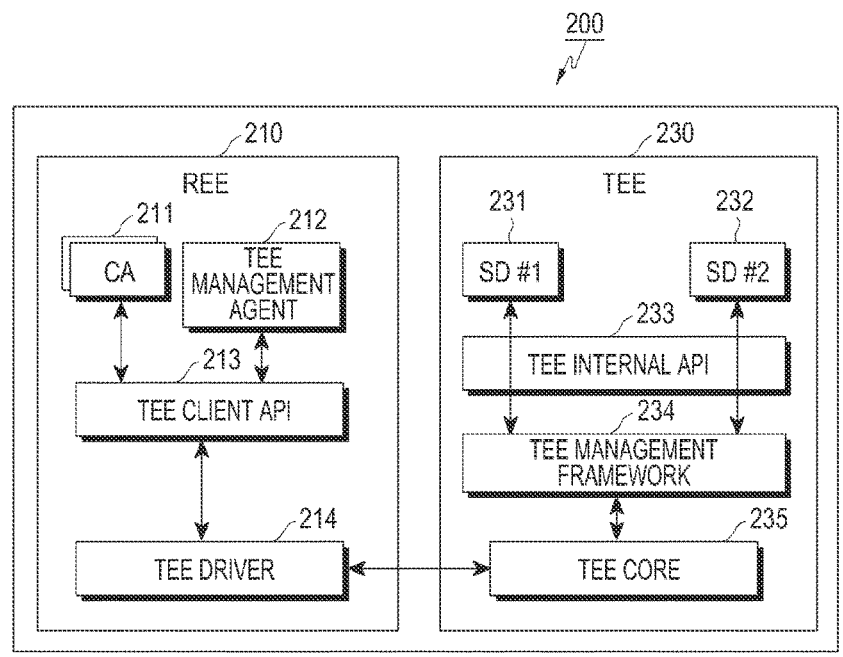
FIG. 2 is a block diagram illustrating a configuration example of the terminal in the embodiment of FIG. 1.

FIG. 2 is a block diagram illustrating a configuration example of the terminal 200 in the embodiment of FIG. 1. The terminal 200 of FIG. 2 includes a Rich Execution Environment (REE) block 210 and a TEE block 230. In each block, the REE and TEE may refer to a trusted zone technology in a Global Platform (GP), and the REE block 210 and the TEE block 230 may be implemented in an Application Processor (AP) installed in the terminal 200. The REE block 210 is a block processing a Rich Operating System (OS) application environment. The REE block 210 may be provided and managed by the Rich OS, and this may use a technology defined in the GP. In addition, the REE block 210 may support another OS, and may support, for example, a hypervisor which is a virtual platform capable of simultaneously driving a plurality of operating systems. It is considered that an environment and applications driven in the REE block 210 are not trusted. The TEE block 230 is driven together with the REE block 210, but is separated from the REE block 210. The TEE block 230 has a security capacity, and satisfies security related requirements. For example, the TEE block 230 defends a normal software attack, defines a severe safeguard for data and a function which may be accessed by a program, and resists a set of defined threats.

In FIG. 2, the REE block 210 may include a Client Application (CA) 211, a TEE management agent 212, a TEE client Application Programming Interface (API) 213 which is a standard interface enabling the CA 211 to communicate with a Trusted Application (TA) (not shown) in the TEE, and a TEE driver 214 for low level communication with the TEE block 230. The REE block 210 may use a known art. Further, the TA is (are) application(s) driven in the TEE block 230 providing a security related function to the client application(s) 211 outside of the TEE block 230. The CA is (are) application(s) driven outside of the TEE block 230 using the TEE client API 213 to access facilities provided from the TAs in the TA block 230. The application(s) of FIG. 1 may be at least one of the TA, the CA and another application (or other applications) driven in the terminal 200.

In FIG. 2, the TEE block 230 may include one or more Security Domains (SDs) 231 and 232 (or at least one TA (not shown)), a TEE internal API 233, a TEE management framework 234, and a TEE core 235. Here, the TA and the SDs 231 and 232 provide a TEE based trusted function from the REE block 210 to the CA 211. The SDs 231 and 232 are devices indicating an authority in a TEE administration security model, and the SDs 231 and 232 are in charge of a control of a management operation. The SDs 231 and 232 may provide the TEE, manage a use period of the TA, and execute a sensitive code such as the TA.

An operation of the system in FIG. 2 is described. The service server 110 and the management server 130 perform a mutual authentication, and the service server 110 transmits the management instruction to the management server 130. Then, the management server 130 configures the communication connection with the terminal 200 to transmit the management instruction through the communication network 10. After the communication connection is configured, the TEE management agent 212 of the terminal 200 receives the management instruction transmitted from the management server 130 through the communication network 10, and transfers the received management instruction to the TEE management framework 234 through the TEE driver 214 and the TEE core 235. Then, the TEE management framework 234 executes the management instruction for the transferred application(s), and transmits an execution result to the management server 130.

Therefore, according to the configuration of FIGS. 1 and 2, the application of the terminal 200 may be remotely managed using a TEE technique for a security platform through the communication between the management server 130 and the terminal 200.

However, in the case of FIGS. 1 and 2, data may be transmitted through a public channel and a management software may be executed in an REE of which a security is not guaranteed. Therefore, a more reliable method for remotely managing an application is necessary. In addition, in a communication environment in which the IP based communication network 10 such as the WAN cannot be used, a remote management cannot be performed. Therefore, in example embodiments below, a method of remotely managing an application, which may strengthen a security by using an MNO and may be performed in even a communication environment in which a WAN cannot be used by using a wireless network of the MNO is proposed.

Figure 3:
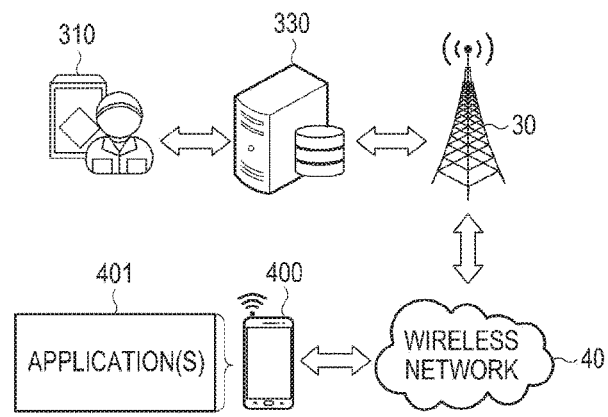
FIG. 3 is a block diagram illustrating an example of a wireless communication system for remotely managing an application of a terminal according to another embodiment of the present disclosure.

FIG. 3 is a block diagram illustrating an example of a wireless communication system for remotely managing an application of a terminal according to another embodiment of the present disclosure. The embodiment of FIG. 3 proposes a method of remotely managing a TA and an SD in a TEE block through a mobile communication network 30 operated by a communication operator of a mobile communication (i.e., a Mobile Network Operator (MNO)).

The wireless communication system of FIG. 3 includes a service server 310 of a Service Provider (SP), a management server 330 transmitting a management instruction for a remote management of the application(s) 401 to a terminal 400 according to a request of the service server 310, a mobile communication network 30 operated by the MNO, various wireless networks 40 such as a Wi-Fi network, which are connected to the mobile communication network 30, and the terminal 400 receiving the management instruction for the application(s) 401 from the management server 330 through the mobile communication network 30 to execute the management instruction. In the configuration of FIG. 3, when the terminal 400 is connected to the mobile communication network 30, the various wireless networks 40 may be omitted. In FIG. 3, the service server 310 provides the application(s) 401 executed in the terminal 400 according to a remote instruction. The management server 130 transmits the management instruction for at least one remote management related to an installation, an updating, a removing, an auditing, a locking, a unlocking, and a data migration (which includes a data movement to another terminal or an external server, and the like), and the like of the application(s) 401 to the terminal 400 through the mobile communication network 30 of the MNO according to the request of the service server 310. The application(s) of FIG. 3 may be at least one of the TA, the CA and another application (or other applications) driven in the terminal 400.

In FIG. 3, the terminal 400 executes the management instruction in a TEE for a secured remote management of the application(s) 401, and transmits an execution result of the management instruction to the management server 330 through the mobile communication network 30. The operator server 310 may remotely manage the application(s) 401 by transmitting the management instruction to the terminal 400 through the management server 330. The management server 330 may provide an authorization between the operator server 310 and the terminal 400, and may configure a communication connection with the terminal 400 through the communication network 30. In the embodiment of the FIG. 3, an employment of the mobile communication network 30 in the remote management is for excluding a use of a public channel based network such as the WAN, and may prevent a situation wherein the terminal 400 is located in an environment in which a security is not secured.

In the embodiment of FIG. 3, the terminal may be implemented with two different configurations. Both of the terminal configurations include an REE block and a TEE block. But, a terminal of a first configuration in the two terminal configurations exemplifies a configuration of a terminal which does not use a Subscriber Identification Module (SIM) card or a Universal Integrated Circuit Card (UICC) chip, and a terminal of a second configuration in the two terminal configurations exemplifies a configuration of a terminal which uses the SIM card or the UICC chip. In addition, in the terminals of the first and second configurations, the TEE block includes a trusted user interface providing a user interface for receiving an input from a user whether the user executes a management instruction related to an installation, an updating, a removing, an auditing, a locking, an unlocking, a migration and the like of application(s) 301.

Therefore, the user of the terminal may identify a list (i.e., the installation, updating, removing, auditing, locking, unlocking, migration and the like of the application(s) 301) of the management instruction through the trusted user interface. The service provider may remotely control the application(s) 301 of the terminal 400 through the management instruction.

Table 1 below shows an example of the management instruction.

TABLE 1

| Management instruction | Contents |
| --- | --- |
| Install | An application installation instruction is initiated by an end user. An example of a submission of the applicaton includes a web registration. |
| Update | Application updating. This may be initiated by a user or a service provider. |
| Remove | Applicaton removing. This may be initiated by a user or a service provider. |
| Audit | Application auditing. This may be initiated by a service provider. |
| Lock | Application locking. This may be initiated by a service provider. |
| UnLock | Application lock unlocking. This may be initiated by a service provider. |

TABLE 1-continued

| Management instruction | Contents |
| --- | --- |
| Migration | Application data migration to another terminal or device. Data migration to another device. This may be initiated by a end user. |

Hereinafter, the terminal of the first configuration is described with reference to FIGS. 4 and 5, and the terminal of the second configuration is described with reference to FIGS. 6 and 7. The terminal configuration of FIGS. 4 and 6 is illustrated in a functional block for a specific description, but the terminal configuration may include an application processor (or a control unit) including the REE block and the TEE block, and the communication interface for the wireless communication in the system of FIG. 3.

Figure 4:
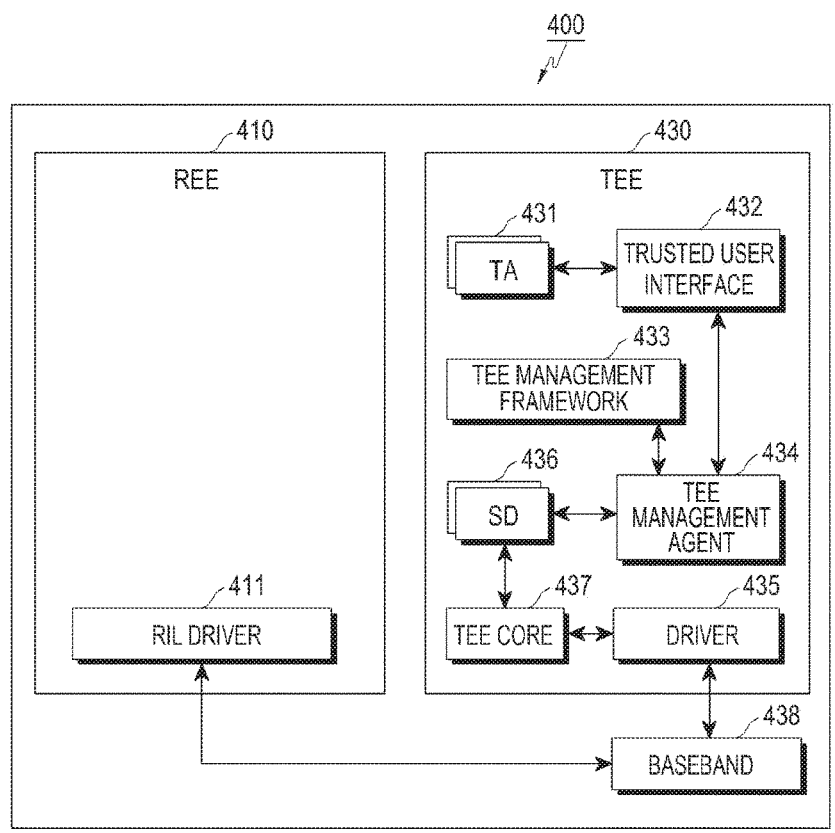
FIG. 4 is a block diagram illustrating a first configuration example of a terminal in a wireless communication system according to another embodiment of the present disclosure.

First, FIG. 4 is a block diagram illustrating a first configuration example of a terminal in a wireless communication system according to another embodiment of the present disclosure. The terminal 400 of FIG. 4 includes an REE block 410 and a TEE block 430. The terminal 400 of FIG. 4 does not use a SIM card or a UICC chip, and uses an SD.

Referring to FIG. 4, the REE block 410 includes, for example, a Radio Interface Layer (RIL) driver 411 or an operation through a baseband according to an embodiment of the present disclosure. The terminal 400 accesses to a baseband module 438 using the RIL driver 411 to perform communication. For convenience of description, only the RIL driver 411 is illustrated in the REE block 410, but the REE block 410 may further include the CA, a means for a voice communication service in which a driver interface is used, a means for various message services, and the like. The TEE block 430 includes a TA 431 providing trusted functions from the REE block 410 to the CA (not shown), a Trusted User Interface (TUI) 432 providing a security graphic user interface by a TEE, a TEE management framework 433 executing the management instruction, a TEE management agent 434 providing an interaction with the TEE management framework 433, a driver 435 (e.g., 7816 driver and the like) providing a communication connection of a low level to the baseband module 438, a TEE core 437 implementing a TEE logic, and the baseband module 438 for using a mobile communication service through the mobile communication network 30.

In addition, the terminal 400 of FIG. 4 includes an SD 436 instead of the SIM card or the UICC chip. The SD 436 may manage a life cycle of the TA 431, and may provide the following 1) to 4) functions corresponding to the SIM card or the UICC chip.

1) a wide range of cryptographic algorithms
2) A use of a secure storage having a capacity comparatively larger than that of the SIM card or the UICC chip
3) An application execution in a secured environment
4) A support of wide range of peripherals The SD 436 may be implemented with a software, may be connected to the baseband module 438 through the driver 435, and may completely replace a use of an external smart chip such as the SIM card or the UICC chip. In the present embodiment, the function of the SD 436 may reduce a manufacturing cost of the terminal 400 supporting the remote management, and may reduce the size of the terminal 400. In addition, the terminal 400 may use a certified secure OS.

Figure 5:
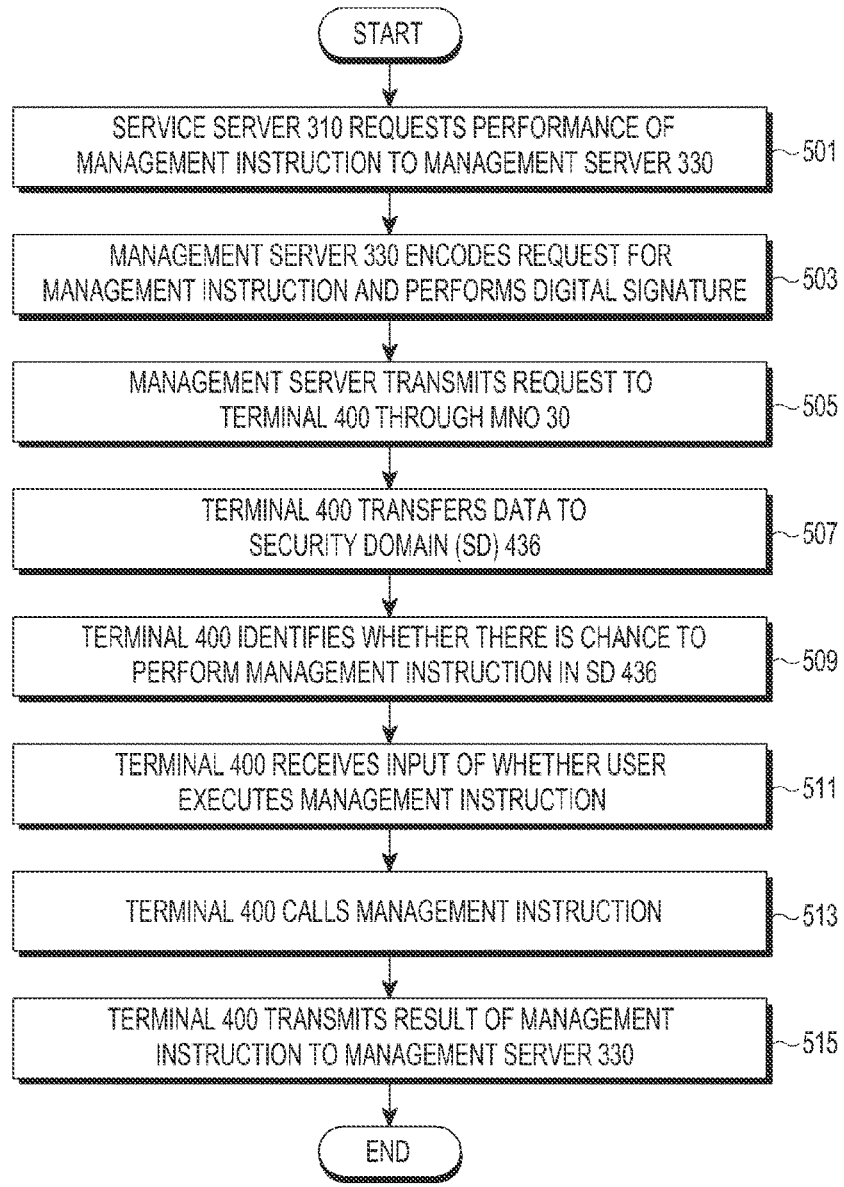
FIG. 5 is a flowchart illustrating a method for remotely managing an application when a first configuration of a terminal is applied to a wireless communication system according to another embodiment of the present disclosure.
Figure 6:
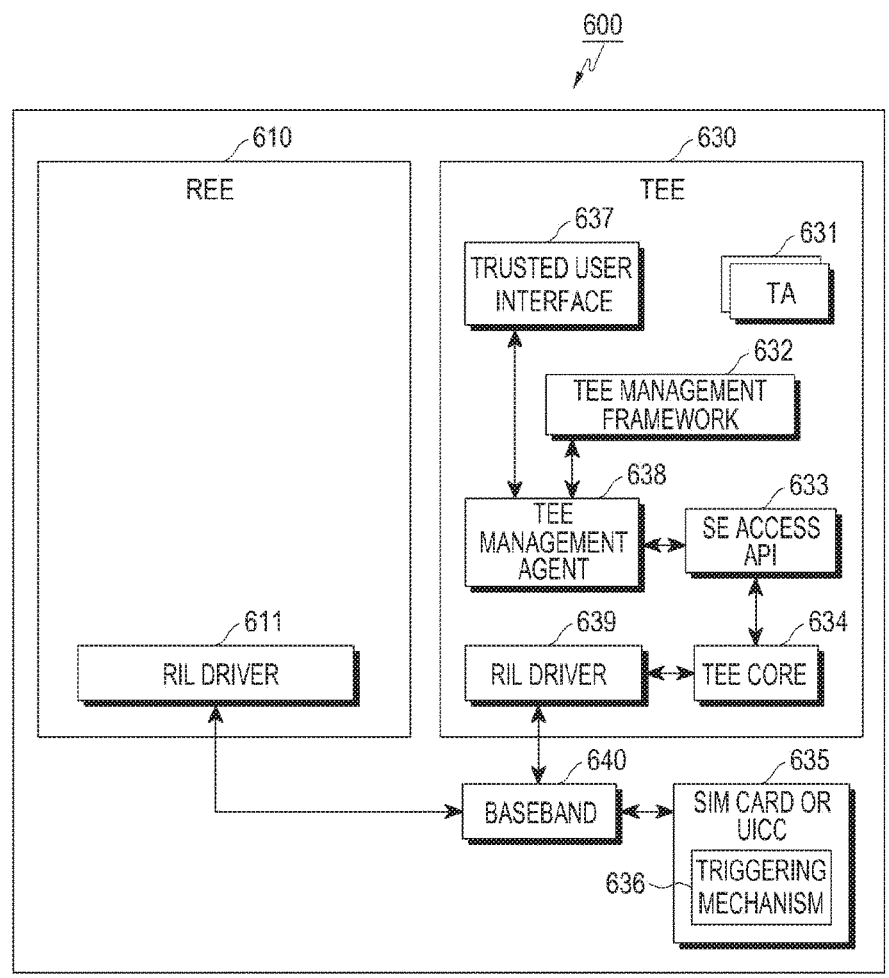
FIG. 6 is a block diagram illustrating a second configuration example of a terminal in a wireless communication system according to another embodiment.

FIG. 5 is a flowchart illustrating a method for remotely managing an application when a first configuration of a terminal is applied to a wireless communication system according to another embodiment of the present disclosure.

Referring to FIG. 5, in step 501, the service server 310 requests a performance of the management instruction to the management server 330. The management server 330 may identify whether the service server 310 has an authority to execute the management instruction. To this end, the management server 330 may maintain a logging for actions related to the remote management. In step 503, the management server 330 encodes the request for the management instruction and performs a digital signature. An encryption key used at this time may be pre-set in the TEE management agent 434 in the terminal 400 and the management server 330, and may use an asymmetric algorithm distribution of the encryption key. In step 505, the management server 330 may transmit a request containing the management instruction for the remote management to the terminal 400 through the mobile communication network 30 of the MNO together with a predetermined certificate.

Next, in step 507, the terminal 400 receiving the request containing the management instruction through the mobile communication network 30 transfers data included in the request to the SD 436. At this time, the baseband module 438 of the terminal 400 may transfer the data to the SD 436 through the driver 435. To this end, the TEE core 437 transfers the data to the SD 408 together with the driver. In addition, in step 509, the TEE management agent 434 identifies whether there is a change to perform the management instruction in the SD 436. At this time, the SD 436 may autonomously start the data transmission to the TEE management agent 406 according to an implementation method. Further, the TEE management agent 434 verifies the digital signature and decodes the data. In step 509, a series of procedures prevent damage to the integrity of the data.

Next, in step 511, the TEE management agent 434 receives an input of a user whether the user executes the management instruction. The user selects whether the user accepts the execution of the management instruction or rejects the execution of the management instruction using a user interface provided through the trusted user interface 432. At this time, a list such as the list shown in Table 1 may be provided through the user interface, and the user may handle the user interface to selectively execute each management instruction. Next, a result of the management instruction selected according to the operation of step 511 may be fed back to the management server 330. The management instruction selected in step 511 may be called by the TEE management agent 434 in step 513. In step 515, the TEE management agent 434 transmits the result of the management instruction to the management server 330. Meanwhile, although not shown, the management server 330 may verify and decode result data received from the terminal 400 through a digital signature and the like. In addition, the management server 330 may store a state after the remote management using a snap shot and the like.

FIG. 6 is a block diagram illustrating a second configuration example of a terminal in a wireless communication system according to another embodiment. The terminal 600 of FIG. 6 includes an REE block 610 and a TEE block 630, and uses a SIM card or a UICC chip. Reference numerals different from those of the terminal 400 of FIG. 4 are given to the terminal 600 of FIG. 6. The terminal 600 of FIG. 6 may be applied to the system of FIG. 3, and may receive a management instruction through the mobile communication network 30 to execute the management instruction.

Referring to FIG. 6, the REE block 610 includes an RIL driver 611 as an example of an interaction driver, for an operation through a baseband equally to the embodiment of FIG. 4. The terminal 600 accesses a baseband module 640 using the RIL driver 611 to perform communication. For convenience of description, only the RIL driver 611 is illustrated in the REE block 610, but the REE block 610 may further include the CA, a means for a voice communication service in which a driver interface is used, a means for various message services, and the like. The TEE block 630 includes a TA 631 providing trusted functions from the REE block 610 to the CA, a Trusted User Interface (TUI) 637 providing a security graphic user interface by a TEE, a TEE management framework 632 executing the management instruction, a TEE management agent 638 providing an interaction with the TEE management framework 632, a TEE core 634 implementing a TEE logic, and a baseband module 640 for using a mobile communication service through the mobile communication network 30.

In addition, the terminal 600 of FIG. 6 includes a Secure Element (SE) access API 633 providing a communication interface between the TEE management agent 638 and the SIM card or the UICC chip 635, a triggering mechanism providing a signaling for a necessity of a performance of the remote management, and an interaction driver 639 (e.g., RIL driver) of the TEE providing a communication connection of a low level to the baseband module 640. The driver 639 provides a baseband access of the TEE core 634.

Figure 7:
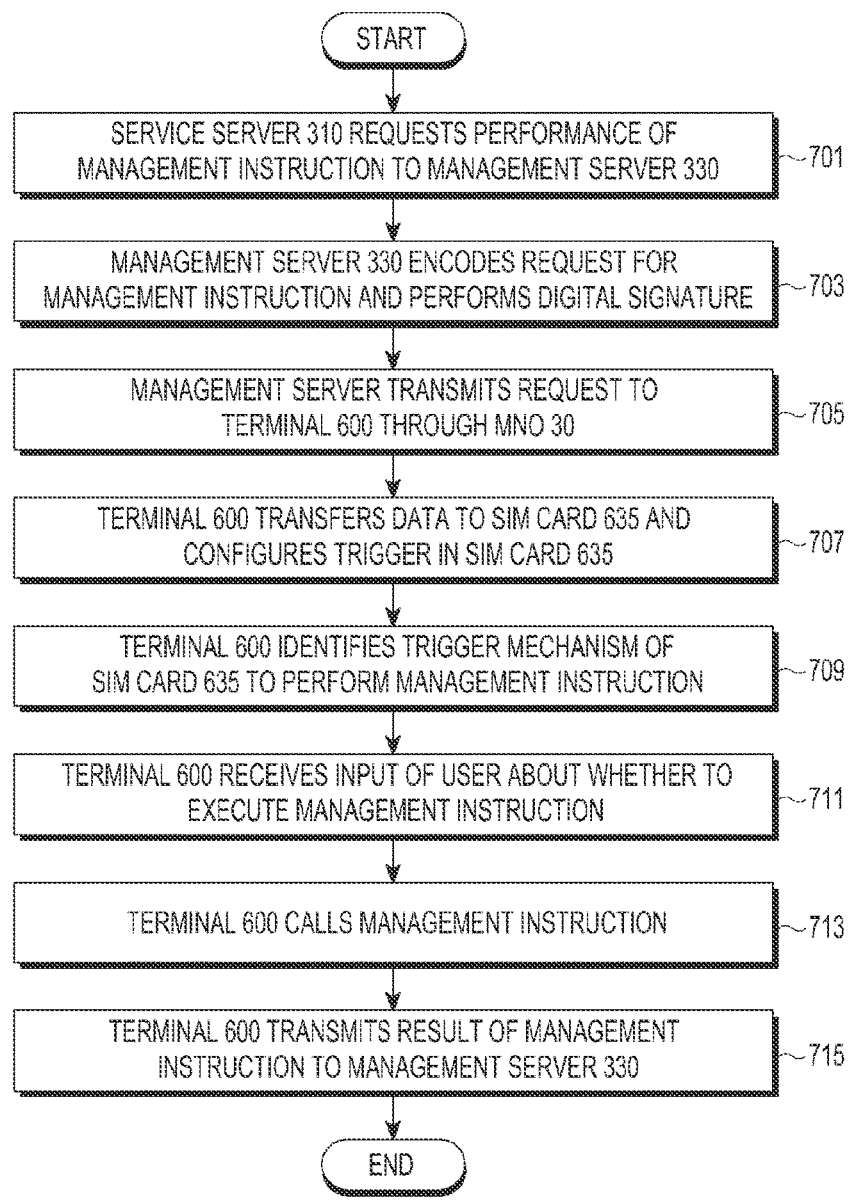
FIG. 7 is a flowchart illustrating a method for remotely managing an application when a second configuration of a terminal is applied to a wireless communication system according to another embodiment of the present disclosure.

FIG. 7 is a flowchart illustrating a method for remotely managing an application when a second configuration of a terminal is applied to a wireless communication system according to another embodiment of the present disclosure.

Referring to FIG. 7, in step 701, the service server 310 requests a performance of the management instruction to the management server 330. The management server 330 may identify whether the service server 310 has an authority to execute the management instruction (e.g., the management server 330 identifies an compliance for the authority). To this end, the management server 330 may maintain a logging for actions related to the remote management. In step 703, the management server 330 encodes the request for the management instruction and performs a digital signature. An encryption key used at this time may be pre-set in the TEE management agent 638 in the terminal 700 and the management server 330, and may use an asymmetric algorithm distribution of the encryption key. In step 705, the management server 330 may transmit a request containing the management instruction for the remote management to the terminal 600 through the mobile communication network 30 of the MNO together with a predetermined certificate.

Next, in step 707, the baseband module 640 of the terminal 600 receiving the request containing the management instruction through the mobile communication network 30 transfers data included in the request to the SIM card or the UICC chip 635. The terminal 600 configures a trigger 636 in the SIM card or the UICC chip. The TEE management agent 638 processes the configured trigger, and receives the management instruction. In step 709, the TEE management agent 638 identifies whether there is a change to perform the management instruction in the SIM card or the UICC chip 635 through the SE access API 633. The TEE management agent 638 verifies the digital signature and decodes the received data. In step 709, a series of procedures prevent damage to the integrity of the data.

Next, in step 711, the TEE management agent 638 receives an input of a user about whether to execute the management instruction. The user selects whether the user accepts the execution of the management instruction or rejects the execution of the management instruction using a user interface provided through the trusted user interface 637. At this time, a list such as the list shown in Table 1 may be provided through the user interface, and the user may handle the user interface to selectively execute each management instruction. Next, a the result of the management instruction selected according to the operation of step 711 may be fed back to the management server 330. The management instruction selected in step 711 may be called by the TEE management agent 638 in step 713. In step 715, the TEE management agent 638 transmits the result of the management instruction to the management server 330. Meanwhile, although not shown, the management server 330 may verify and decode result data received from the terminal 600 through a digital signature and the like. In addition, the management server 330 may store a state after the remote management using a snap shot and the like.

According to the embodiments of the present disclosure, the secured management instruction for the remote management of the application may be transmitted to the terminal by using the mobile communication network of the MNO, and the TEE block of the terminal may receive and process the management instruction. At this time, the terminal may use the SIM card or the UICC chip or the SD instead of the SIM card or the UICC chip in receiving the remote instruction through the baseband. Further, the terminal may receive a selection input for the acceptance or rejection of the management instruction through the trusted user interface, and may transmit the execution result to the management server when the management instruction is executed.

What is claimed is:

1. A method for supporting remote management of an application by a terminal in a wireless communication system, the method comprising:
receiving a management instruction for remote management of the application from a management server via a baseband processor for a mobile communication service in response to a request of a service server providing the application;
determining whether the terminal includes a security domain (SD) in a trusted execution environment (TEE), an external subscriber identification module (SIM), or an external universal integrated circuit card (UICC), wherein the TEE is a secured environment, and the SD replaces the external SIM or the external UICC;
when the terminal includes the SD, transferring the management instruction to the SD through a driver of the baseband processor and executing the management instruction in the SD, wherein the SD manages a life cycle of a trusted application (TA) in the secured environment;
when the terminal includes one of the SIM or the UICC, transferring the management instruction to the SIM or the UICC through a secure element accessing an application programming interface and executing the management instruction in the SIM or the UICC, respectively; and
transmitting an execution result of the management instruction to the management server via the baseband processor.

2. The method of claim 1, wherein executing the management instruction in the SD further comprises receiving an input of a user for whether the user executes the management instruction using a trusted user interface in the terminal.

3. The method of claim 2, wherein, when a number of the management instructions are plural, the input for whether the user executes the management instruction is selectively performed for the plurality of management instructions.

4. The method of claim 1, wherein the management instruction includes at least one of an instruction related to an installation, an updating, a removing, an auditing, a locking, an unlocking and a data migration of the application, and the service server remotely controls the application using the management instruction.

5. The method of claim 1, wherein the management instruction is received together with a predetermined certificate from the management server through the wireless communication system.

6. The method of claim 1, wherein the management server provides an authorization between the service server and the terminal.

7. A terminal for supporting remote management of an application in a wireless communication system, the terminal comprising:
a communication interface for wireless communication; and
a controller configured to:
receive a management instruction for remote management of the application from a management server via a baseband processor for a mobile communication service in response to a request of a service server providing the application,
determine whether the terminal includes a security domain (SD) in a trusted execution environment (TEE), an external subscriber identification module (SIM), or an external universal integrated circuit card (UICC), wherein the TEE is a secured environment, and the SD replaces the external SIM or the external UICC,
when the terminal includes the SD, transfer the management instruction to the SD through a driver of the baseband processor, and execute the management instruction in the SD, wherein the SD manages a life cycle of a trusted application (TA) in the secured environment,
when the terminal includes one of the SIM or the UICC, transfer the management instruction to the SIM or the UICC through a secure element accessing an application programming interface and execute the management instruction in the SIM or the UICC, respectively, and
transmit an execution result of the management instruction to the management server via the baseband processor.

8. The terminal of claim 7, wherein the controller is further configured to receive an input of a user for whether the user executes the management instruction using a trusted user interface.

9. The terminal of claim 8, wherein, when a number of the management instructions are plural, the input for whether the user executes the management instruction is selectively performed for the plurality of management instructions.

10. The terminal of claim 7, wherein the management instruction includes at least one of an instruction related to an installation, an updating, a removing, an auditing, a locking, an unlocking and a data migration of the application, and the service server remotely controls the application using the management instruction.

11. The terminal of claim 7, wherein the management instruction is received together with a predetermined certificate from the management server through the wireless communication system.

12. The terminal of claim 7, wherein the management server provides an authorization between the service server and the terminal.

\* \* \* \* \*